US010886960B2

(12) United States Patent
Lin et al.

(10) Patent No.: US 10,886,960 B2
(45) Date of Patent: Jan. 5, 2021

(54) BUTTON ASSEMBLY (71) Applicant: Cheng Uei Precision Industry Co., LTD., New Taipei (TW)

(72) Inventors: Chih-Chiang Lin, New Taipei (TW);
Te-Hung Yin, New Taipei (TW);
Chun-Fu Lin, New Taipei (TW);
Sheng-Nan Yu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/733,184

(22) Filed: Jan. 2, 2020

(65) Prior Publication Data

US 2020/0366327 A1  Nov. 19, 2020

(30) Foreign Application Priority Data

May 15, 2019  (CN) .................... 2019 2 0695439 U (51) Int. Cl.
*H04B 1/3816* (2015.01)
*H04B 1/3818* (2015.01)
*G06K 7/00* (2006.01)
*G06K 13/08* (2006.01)
*H04M 1/02* (2006.01)
*H01R 13/62* (2006.01)

(52) U.S. Cl.
CPC ......... *H04B 1/3818* (2015.01); *G06K 7/0056* (2013.01); *G06K 13/08* (2013.01); *G06K 13/0812* (2013.01); *G06K 13/0862* (2013.01); *H01R 13/62* (2013.01); *H04B 1/3816* (2013.01); *H04M 1/026* (2013.01)

(58) Field of Classification Search
CPC ..... H01R 13/62; Y10S 439/946; G06K 13/08; G06K 13/0812; G06K 13/0862; H04B 1/3816; H04B 1/3818
See application file for complete search history.

(56) References Cited

U.S. PATENT DOCUMENTS

| 8,292,642 | B1* | 10/2012 | Lee | ....................... | G06K 7/0026 |
| | | | | | 439/159 |
| 8,376,764 | B1* | 2/2013 | Su | ....................... | G06K 13/0831 |
| | | | | | 439/157 |
| 8,913,396 | B2* | 12/2014 | Chao | .................... | H04B 1/3816 |
| | | | | | 361/754 |
| 9,106,310 | B2* | 8/2015 | Dondzik | .............. | H04B 1/3888 |

(Continued)

*Primary Examiner* — Tho D Ta
(74) *Attorney, Agent, or Firm* — Cheng-Ju Chiang (57) ABSTRACT

A button assembly of the present invention is configured in a communication equipment. The button assembly includes a button, a tray and at least an elastic arm. A side of the button is recessed inward to form a holding space. At least an inner side wall of the holding space is recessed to form a clamping groove. The tray is disposed in the holding space. The elastic arm has a fixing portion mounted on a side wall of the tray. The fixing portion is extended frontward and is protruded outward to form a contact part. The contact part is extended frontward and outward to form a clamping part disposed in the clamping groove. The clamping groove and the elastic arm are disposed to provide the button and the tray to be fixed or disengaged, achieving an effect of saving space in assembling of internal components of the communication equipment.

3 Claims, 8 Drawing Sheets

(56) References Cited

U.S. PATENT DOCUMENTS

| | | | |
|---|---|---|---|
| 10,651,600 B1 * | 5/2020 | Lin | ........................ H01R 12/712 |
| 10,791,643 B1 * | 9/2020 | Lin | ........................ H01R 13/629 |
| 2014/0247568 A1 * | 9/2014 | Lin | ........................ H04B 1/3816 |
| | | | 361/754 |

* cited by examiner

BUTTON ASSEMBLY

BACKGROUND OF THE INVENTION

1. Field of the Invention

The present application is based on, and claims priority from, China application number 201920695439.9, filed May 15, 2019, the disclosure of which is hereby incorporated by reference herein in its entirety. The present invention generally relates to a button assembly, and more particularly to a button assembly capable of sharing slot space and to save extra processing procedures in assembling of internal components of communication equipment.

2. Related Art

With the development of technology, in order to make communication equipment more functional and powerful, more new components are needed to be assembled in the communication equipment. Because of a requirement of being comfortable to touch in use, it is difficult to adjust the size of the communication equipment. Therefore, adjusting volume or configuration of internal components of the communication equipment is necessary.

However, Subscriber Identity Module (SIM) used for storage of user identification information, message information and phone number has been involved in the communication equipment. Because of the configuration of SIM card chip, the size of SIM card cannot be further reduced, so there is a need to combine a SIM card slot with the internal components of the communication equipment to save space for assembly of more new components to allow the communication equipment to carry more renewal functions.

Therefore, it is necessary to provide a button assembly which provides combining of a volume button for audio signals and a SIM card slot to share slot space and to save extra processing procedures in assembling of the internal components of the communication equipment.

SUMMARY OF THE INVENTION

An object of the present invention is to provide a modularized button assembly to overcome the flaws and insufficiency of the conventional button structure.

To attain this, a button assembly of the present invention is configured in a communication equipment, characterized in that: the button assembly includes a button, a tray and at least an elastic arm. A side of the button is recessed inward to form a holding space. At least an inner side wall of the holding space is recessed to form a clamping groove. The tray is combined with the button. A side of the tray is protruded to form a base. The base is disposed in the holding space. The elastic arm is disposed on the tray. The elastic arm has a fixing portion. The fixing portion is mounted on a side wall of the tray. The fixing portion is extended frontward and is protruded outward to form a contact part. The contact part is extended frontward and outward to form a clamping part. The clamping part is arranged corresponding to the clamping groove. The clamping part is disposed in the clamping groove so that the button and the tray are fixed with each other. When the button assembly is configured in the communication equipment, the contact part is push inward to make the clamping part disengaged from the clamping groove to loosen the tray from the button.

Accordingly, a surface of the button has at least a first positioning opening communicated with the holding space. An another surface of the button is recessed to form a holding groove. The holding groove has at least a second positioning opening penetrating through and connecting to the holding space. The second positioning opening is arranged corresponding to the first positioning opening. The base has at least a third positioning opening arranged corresponding to the first positioning opening.

Accordingly, an upper end of the first positioning opening forms an upper limit groove. The button assembly further includes at least a fixing member. The fixing member includes a fixing part and a fixing piece. The fixing part is arranged corresponding to the first positioning opening. An end of the fixing part has a fixing cap. The fixing part penetrates the first positioning opening, the third positioning opening and the second positioning opening. The fixing cap of the fixing part is placed in the upper limit groove. The fixing piece is disposed in the holding groove and is contacted with the fixing part. The fixing part is fixed with the fixing piece by means of spot welding or riveting pressure.

As above, the clamping groove and the clamping part are disposed to form the button assembly which provides the button and the tray are fixed or disengaged. The button and the tray are fixed to each other before configured in the communication equipment and are disengaged from each other after configured in the communication equipment. When the user presses the button for adjusting volume of audio signals, the button is displaced and the tray can avoid being influenced by the rotational displacement of the button and can keep a fixed position in the communication equipment. Therefore, the combining of the button and the tray achieves an effect of sharing slot space and save extra processing procedures in assembling of internal components of the communication equipment.

DESCRIPTION OF THE PREFERRED EMBODIMENTS

In order to describe the technical contents, structural features, purpose to be achieved and the effectiveness of the present invention, the detailed description is given with schema below.

Figure 1:
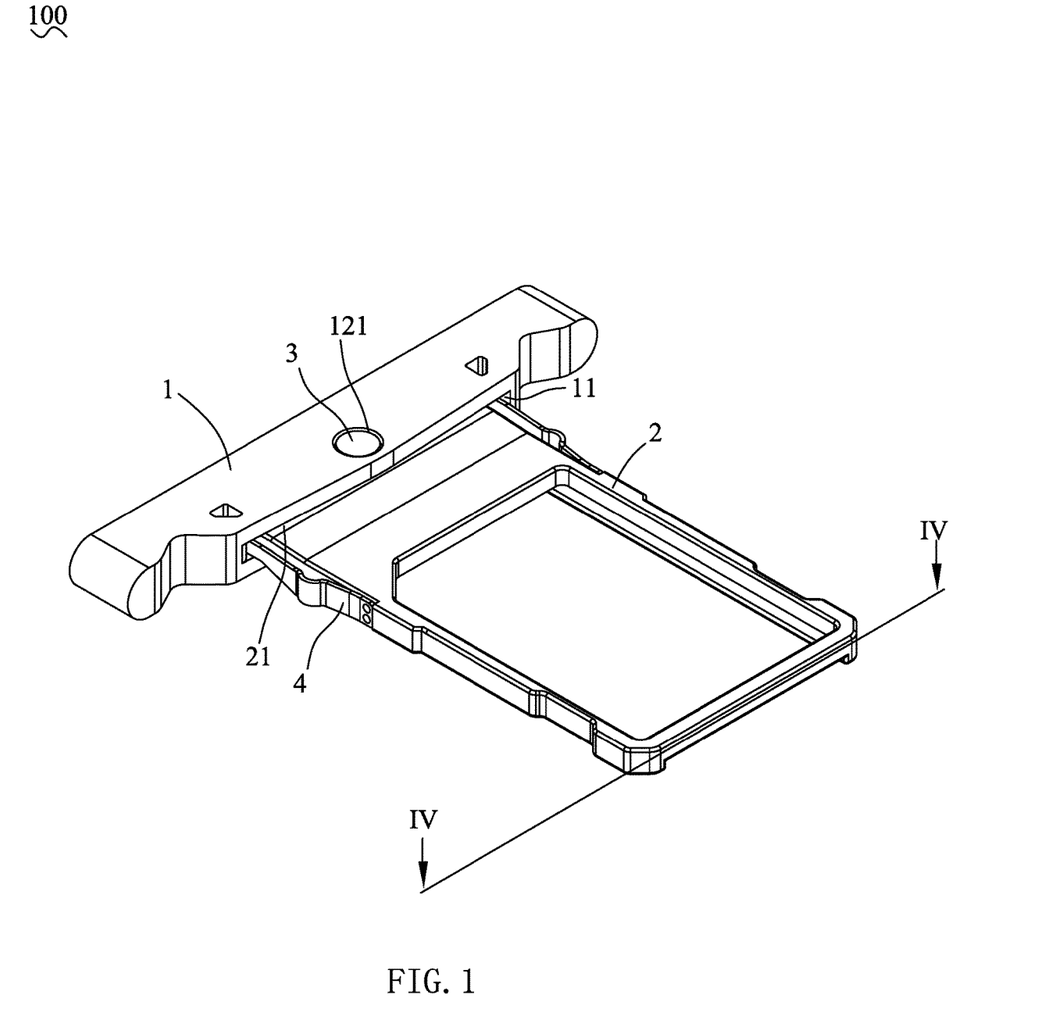
FIG. 1 is a perspective view of button assembly in accordance with the present invention.
Figure 2:
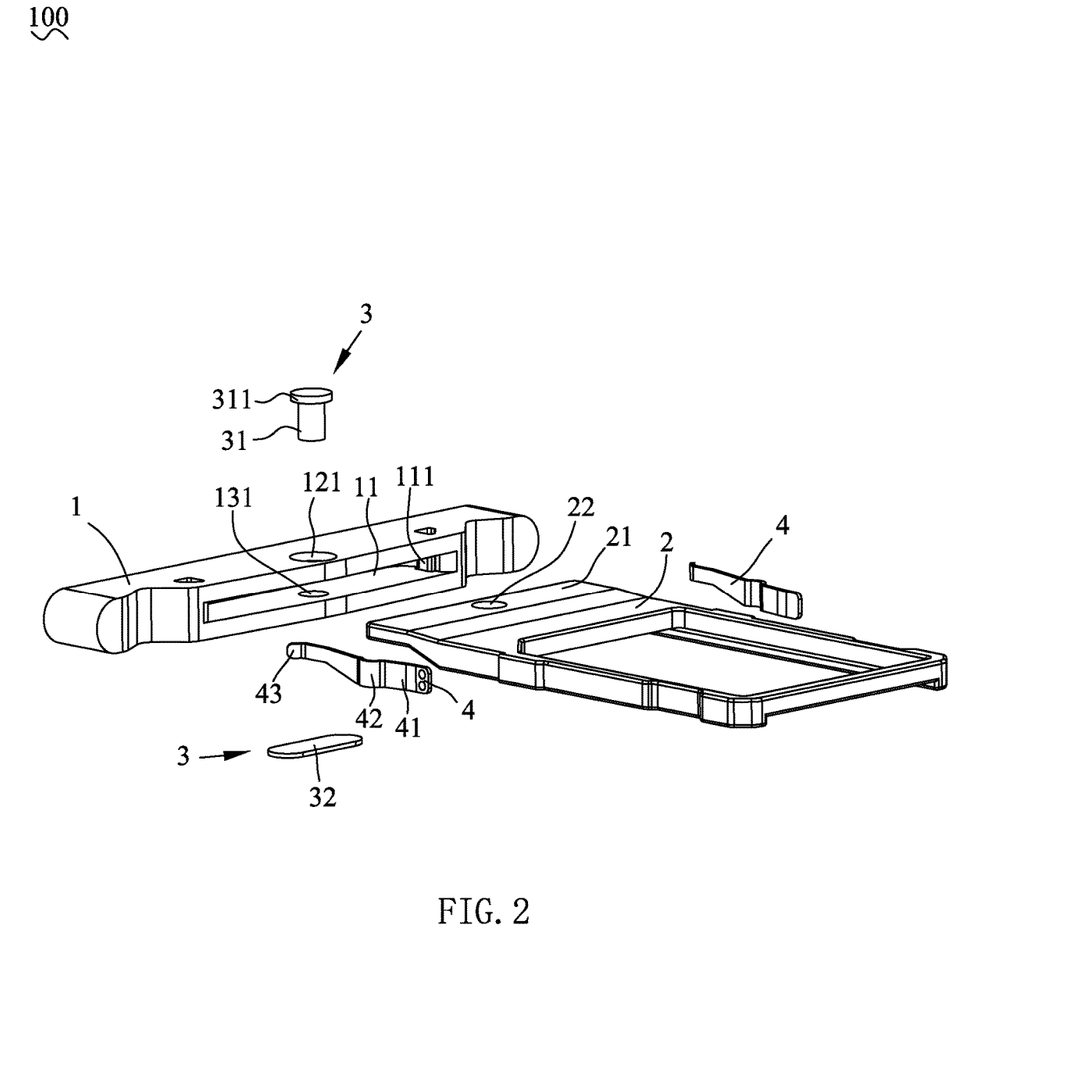
FIG. 2 is an exploded perspective view of FIG. 1.
Figure 3:
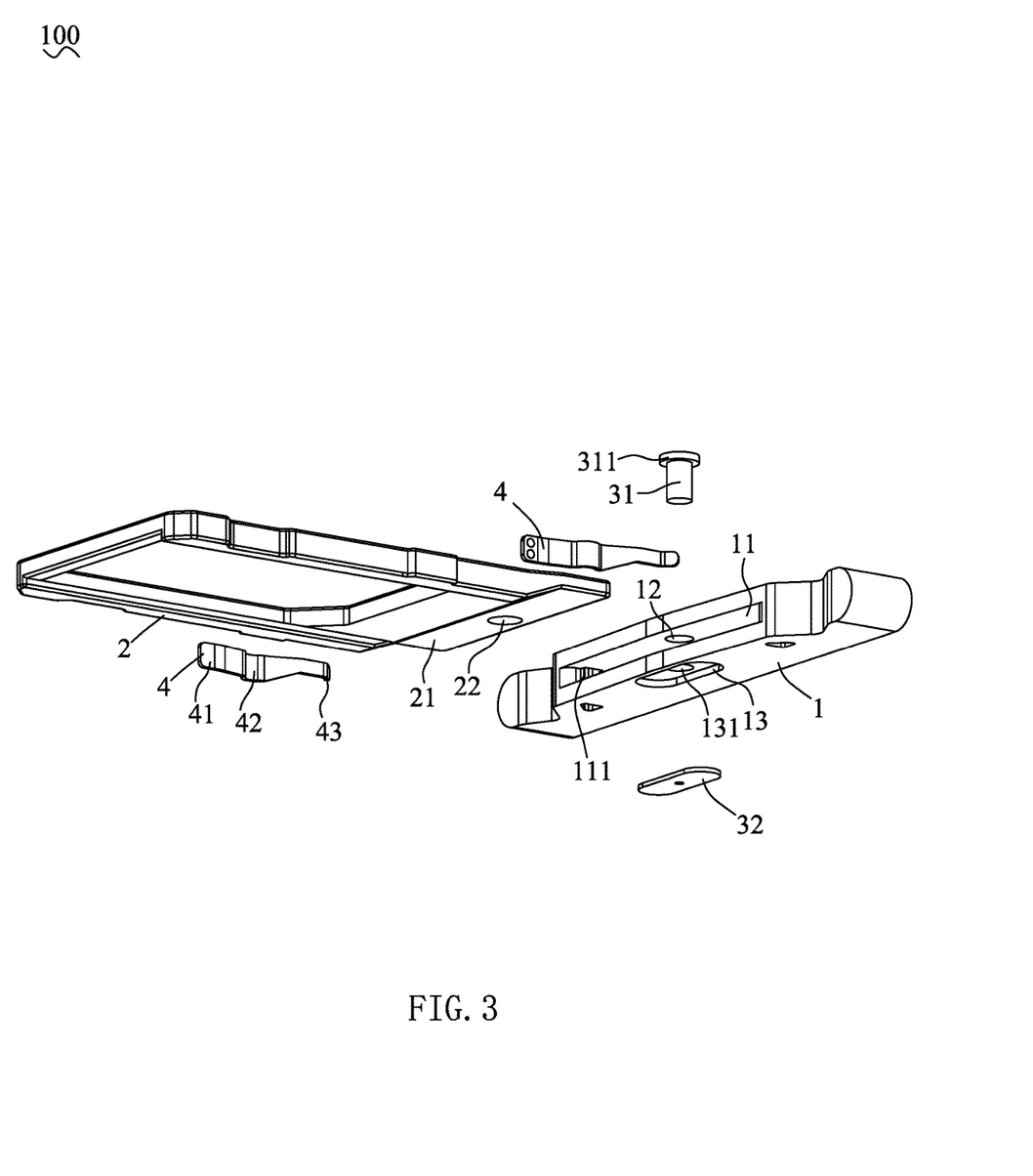
FIG. 3 is an exploded perspective view of FIG. 1 at a different view angle.

Referring to FIG. 1 through FIG. 3, a button assembly 100 in accordance with the present invention includes a button 1, a tray 2, at least a fixing member 3 and at least an elastic arm 4. A side of the button 1 is recessed inward to form a holding space 11. At least an inner side wall of the holding space 11 is recessed to form a clamping groove 111. A surface of the button 1 has at least a first positioning opening 12 communicated with the holding space 11. An upper end of the first positioning opening 12 forms an upper limit groove 121. An another surface of the button 1 is recessed to form a holding groove 13. The holding groove 13 has at least a second positioning opening 131 penetrating through and connecting to the holding space 11. The second positioning opening 131 is arranged corresponding to the first positioning opening 12.

A side of the tray 2 is protruded to form a base 21. The base 21 is disposed in the holding space 11. The base 21 has at least a third positioning opening 22 arranged corresponding to the first positioning opening 12.

The fixing member 3 includes a fixing part 31 and a fixing piece 32. The fixing part 31 is arranged corresponding to the first positioning opening 12. An end of the fixing part 31 has a fixing cap 311. The fixing part 31 penetrates the first positioning opening 12, the third positioning opening 22 and the second positioning opening 131. The fixing cap 311 of the fixing part 31 is placed in the upper limit groove 121. The fixing piece 32 is disposed in the holding groove 13 and is contacted with the fixing part 31. The fixing part 31 is fixed with the fixing piece 32 by means of spot welding or riveting pressure.

The elastic arm 4 is disposed on the tray 2. The elastic arm 4 has a fixing portion 41. The fixing portion 41 is mounted on a side wall of the tray 2 by means of spot welding or riveting pressure. The fixing portion 41 is extended frontward and is protruded outward to form a contact part 42. The contact part 42 is extended frontward and outward to form a clamping part 43. The clamping part 43 is arranged corresponding to the clamping groove 111. The clamping part 43 is disposed in the clamping groove 111 so that the button 1 and the tray 2 are fixed with each other.

Figure 5:
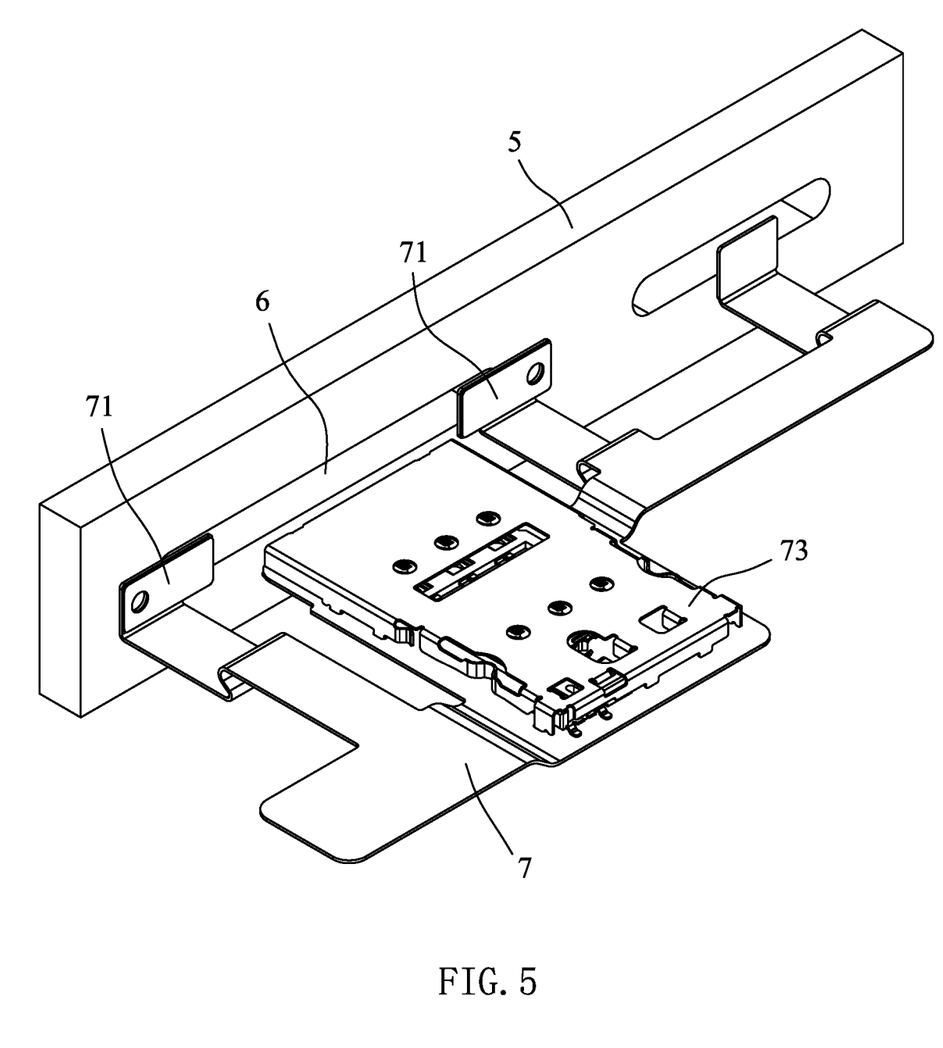
FIG. 5 is a perspective view of button assembly showing internal components in a card slot configured on a side wall of the communication equipment.
Figure 6:
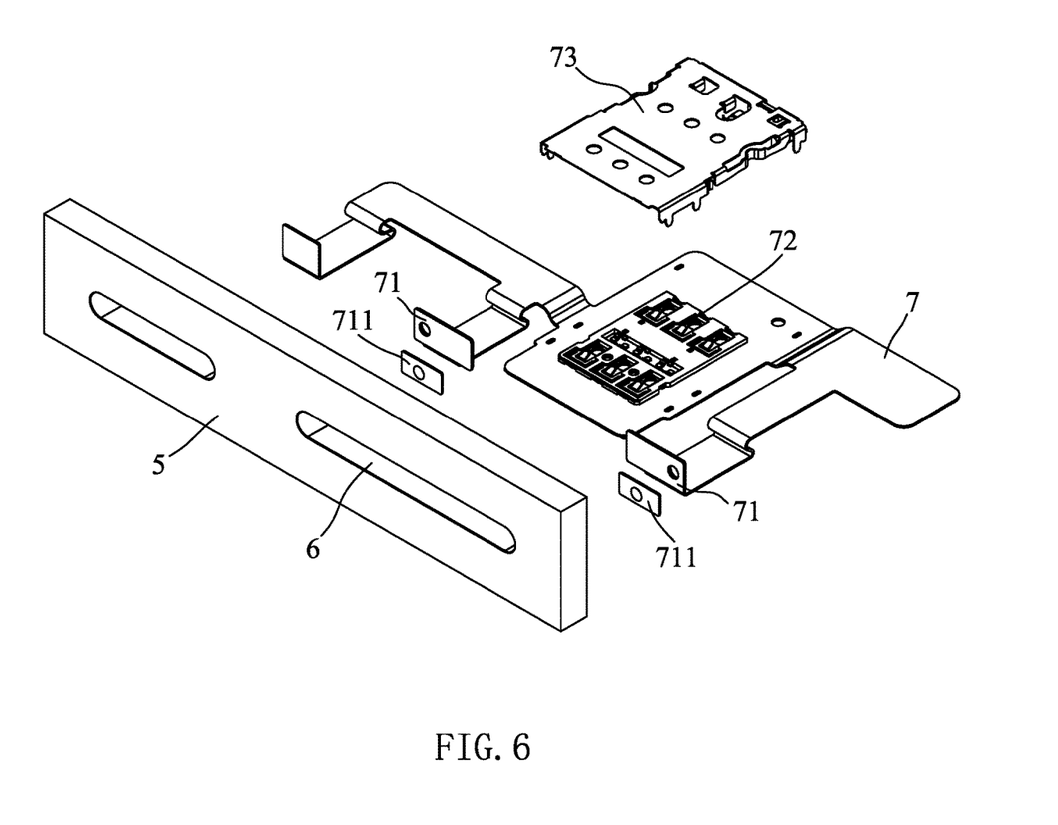
FIG. 6 is an exploded perspective view of FIG. 5.

With reference to FIG. 5 and FIG. 6, the button assembly 100 of the present invention is configured in a card slot 6 located on a side wall 5 of a communication equipment. An inside of the card slot 6 is equipped with a circuit board 7. The circuit board 7 is extended upward to form two extension parts 71. Each of the two extension parts 71 has a press piece 711. The two press pieces 711 are disposed corresponding to two ends of the button 1, respectively. The two press pieces 711 respectively function as increasing and decreasing volume of audio signals of the communication equipment. The circuit board 7 is equipped with a set of terminals 72. The set of terminals 72 is disposed between the two extension parts 71. An iron shell 73 is mounted on the circuit board 7 to cover the set of terminals 72.

Figure 4:
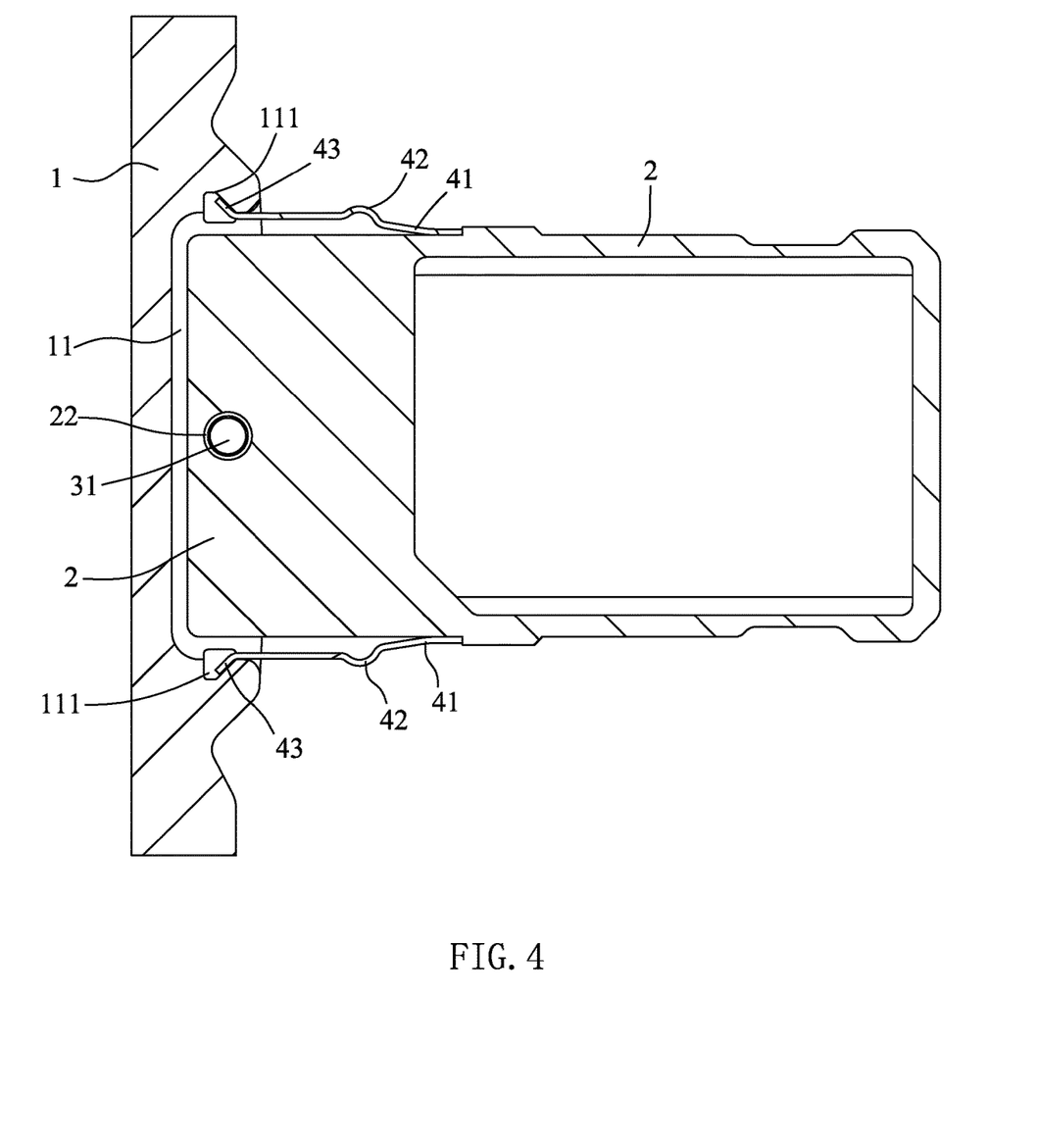
FIG. 4 is a cross-sectional view taken along lines IV-IV of FIG. 1.
Figure 7:
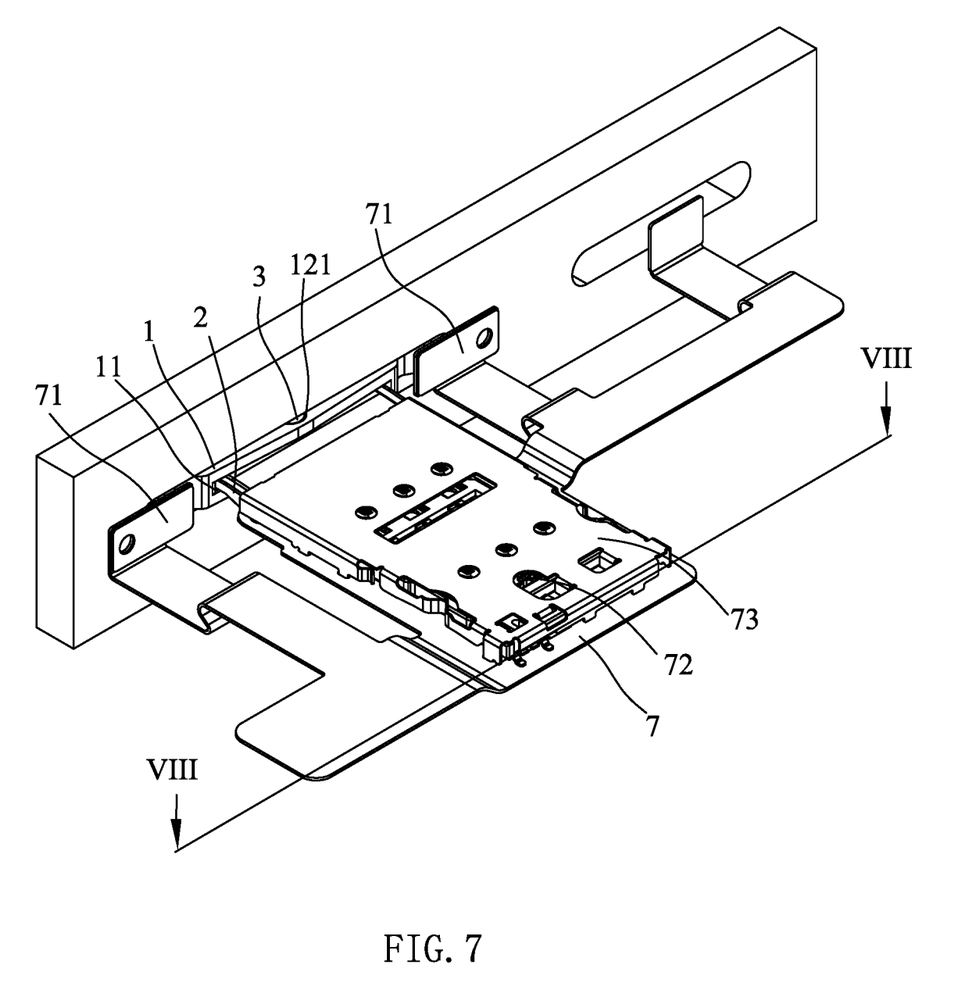
FIG. 7 is a perspective view of button assembly showing internal components in a card slot configured on a side wall of the communication equipment from another angle.
Figure 8:
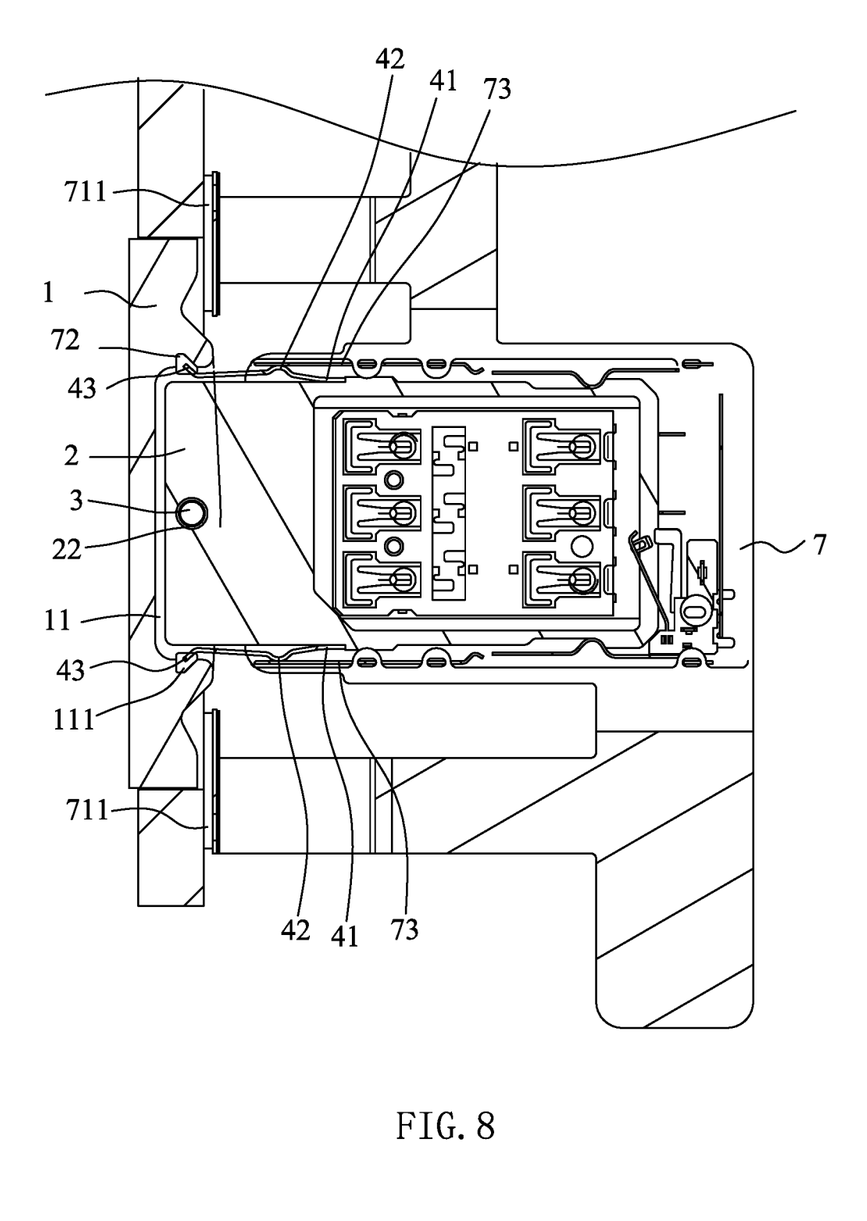
FIG. 8 is a cross-sectional view taken along lines VIII-VIII of FIG. 7.

With reference to FIG. 4, FIG. 7 and FIG. 8, when the button assembly 100 of the present invention is configured in the communication equipment, the elastic arm 4 is assembled in the iron shell 73. The two ends of the button 1 are respectively abutted against the two press pieces 711, which allows a user to press any end of the button 1 equivalent to push the corresponding press piece 711 for a function of increasing or decreasing volume of audio signals of the communication equipment. With a limitation of an inner wall of the iron shell 73, the contact part 42 is push inward to drive the clamping part 43 of the elastic arm 4 to curve inward and store energy of a rebound force, and the clamping part 43 is disengaged from the clamping groove 111 for the loosening of the tray 2 from the button 1. When the user presses any end of the button 1, the button 1 has a rotational displacement with the fixing part 31 as a central axis. A gap between the holding space 11 and the base 21 provides room for the rotational displacement of the button 1 without moving the tray 2, so that the tray 2 can keep a fixed position in the iron shell 73.

When the button assembly 100 is ejected from the communication equipment, the energy of the rebound force stored by the elastic arm 4 is released to bring the contact part 42 and the clamping part 43 back to their initial positions, which makes the clamping part 43 reinstalled in the clamping groove 111, so that the button 1 and the tray 2 are fixed with each other again.

As above, the clamping groove 111 and the clamping part 43 are disposed to form the button assembly 100 which provides the button 1 and the tray 2 are fixed or disengaged. The button 1 and the tray 2 are fixed to each other before configured in the communication equipment and are disengaged from each other after configured in the communication equipment. When the user presses the button 1 for adjusting volume of audio signals of the communication equipment, the button 1 is displaced and the tray 2 can avoid being influenced by the rotational displacement of the button 1 and can keep a fixed position in the communication equipment. Therefore, the combining of the button 1 and the tray 2 achieves an effect of sharing slot space and of saving extra processing procedures in assembling of internal components of the communication equipment.

What is claimed is:

1. A button assembly, configured in a slot of a communication equipment, wherein the button assembly includes a button, a tray and at least an elastic arm, a side of the button is recessed inward to form a holding space, at least an inner side wall of the holding space is recessed to form a clamping groove, the tray is combined with the button, a side of the tray is protruded to form a base, the base is disposed in the holding space, the elastic arm is disposed on the tray, the elastic arm has a fixing portion, the fixing portion is mounted on a side wall of the tray, the fixing portion is extended frontward and is protruded outward to form a contact part, the contact part is extended frontward and outward to form a clamping part, the clamping part is arranged corresponding to the clamping groove, the clamping part is disposed in the clamping groove so that the button and the tray are fixed with each other, when the button assembly is configured in the slot, the contact part is push inward to make the clamping part disengaged from the clamping groove.

2. The button assembly of claim 1, wherein a surface of the button has at least a first positioning opening communicated with the holding space, an another surface of the button is recessed to form a holding groove, the holding groove has at least a second positioning opening penetrating through and connecting to the holding space, the second positioning opening is arranged corresponding to the first positioning opening, the base has at least a third positioning opening arranged corresponding to the first positioning opening.

3. The button assembly of claim 2, wherein an upper end of the first positioning opening forms an upper limit groove, the button assembly further includes at least a fixing member, the fixing member includes a fixing part and a fixing piece, the fixing part is arranged corresponding to the first positioning opening, an end of the fixing part has a fixing cap, the fixing part penetrates the first positioning opening, the third positioning opening and the second positioning opening, the fixing cap of the fixing part is placed in the upper limit groove, the fixing piece is disposed in the holding groove and is contacted with the fixing part, the fixing part is fixed with the fixing piece by means of spot welding or riveting pressure.

* * * * *